United States Patent
Parthasarathy et al.

(10) Patent No.: US 12,142,260 B2
(45) Date of Patent: Nov. 12, 2024

(54) TIME DISTRIBUTIONS OF PARTICIPANTS ACROSS TOPIC SEGMENTS IN A COMMUNICATION SESSION

(71) Applicant: Zoom Video Communications, Inc., San Jose, CA (US)

(72) Inventors: Vijay Parthasarathy, San Jose, CA (US); David Dharmendran Rajkumar, San Francisco, CA (US); Tao Tang, Anhui (CN); Min Xiao-Devins, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 361 days.

(21) Appl. No.: 17/589,835

(22) Filed: Jan. 31, 2022

(65) Prior Publication Data
US 2023/0245646 A1     Aug. 3, 2023

(30) Foreign Application Priority Data

Jan. 20, 2022   (CN) .......................... 202220158700.3

(51) Int. Cl.
*G10L 15/26*     (2006.01)
*G10L 15/04*     (2013.01)
(Continued)

(52) U.S. Cl.
CPC ............ *G10L 15/063* (2013.01); *G10L 15/04* (2013.01); *G10L 15/26* (2013.01); *H04L 12/1822* (2013.01)

(58) Field of Classification Search
CPC .... G06F 18/285; G06F 16/383; G06F 40/131; G06F 40/169; G06F 40/216;
(Continued)

(56) References Cited

U.S. PATENT DOCUMENTS 5,189,727 A * 2/1993 Guerreri ................. G10L 17/02
                                                        704/231
7,127,398 B1 * 10/2006 Yamagishi .......... G10L 15/1822
                                                       704/E15.04
(Continued)

FOREIGN PATENT DOCUMENTS

CN      110869956 A     3/2020
EP        3309730 A1    4/2018

OTHER PUBLICATIONS

International Search Report and Written Opinion mailed on Jun. 7, 2022 in corresponding PCT Application No. PCT/US2022/024829.
(Continued)

*Primary Examiner* — Gerald Gauthier
(74) *Attorney, Agent, or Firm* — Young Basile Hanlon & MacFarlane, P.C.

(57) ABSTRACT

Methods and systems provide for presenting time distributions of participants across topic segments in a communication session. In one embodiment, the system connects to a communication session with a number of participants; receives a transcript of a conversation between the participants produced during the communication session, the transcript including timestamps for each utterance of a speaking participant; determines, based on analysis of the transcript, a meeting type for the communication session; generates a number of topic segments for the conversation and respective timestamps for the topic segments; for each participant, analyzes the time spent by the participant on each of the generated topic segments in the meeting; and presents, to one or more users, data on the time distribution of participants for each topic segment and across topic segments within the conversation.

18 Claims, 5 Drawing Sheets

(51) Int. Cl.
*G10L 15/06* (2013.01)
*H04L 12/18* (2006.01)

(58) Field of Classification Search
CPC ........ G06F 40/284; G06F 40/30; G06F 40/35; G06F 40/197; G06F 40/295; G06Q 10/101; G06Q 10/1095; G06Q 10/10; G06V 40/172; G10L 15/04; G10L 15/063; G10L 15/1822; G10L 15/26; G10L 13/10; G10L 17/02; H04L 12/1813; H04L 12/1822; H04L 12/1827; H04L 12/1831; H04L 51/02; H04L 67/306; H04L 65/403; H04L 67/535; H04M 3/567; H04N 7/15

See application file for complete search history.

(56) References Cited

U.S. PATENT DOCUMENTS

| | | | |
|---|---|---|---|
| 8,214,748 B2 | 7/2012 | Srikanth et al. | |
| 8,296,152 B2* | 10/2012 | Issa | G06Q 10/10 704/270.1 |
| 10,002,345 B2 | 6/2018 | Ganani | |
| 10,200,468 B2 | 2/2019 | Leban et al. | |
| 10,250,547 B1* | 4/2019 | Jain | H04L 67/535 |
| 10,268,990 B2 | 4/2019 | Kitada et al. | |
| 10,553,208 B2 | 2/2020 | Nelson et al. | |
| 10,572,858 B2 | 2/2020 | Nelson et al. | |
| 10,860,985 B2 | 12/2020 | Nelson et al. | |
| 10,990,760 B1* | 4/2021 | Monnett | G06F 40/295 |
| 11,263,593 B1 | 3/2022 | Shetty et al. | |
| 11,521,179 B1 | 12/2022 | Shetty | |
| 11,627,006 B1* | 4/2023 | Chew | H04L 51/02 704/275 |
| 2006/0224430 A1 | 10/2006 | Butt | |
| 2008/0097754 A1* | 4/2008 | Goto | G10L 15/26 704/214 |
| 2008/0162244 A1 | 7/2008 | Oral et al. | |
| 2009/0012787 A1* | 1/2009 | Itoh | G10L 15/26 704/235 |
| 2011/0225013 A1 | 9/2011 | Chavez et al. | |
| 2012/0191500 A1 | 7/2012 | Byrnes et al. | |
| 2013/0254279 A1 | 9/2013 | Bentley et al. | |
| 2014/0082100 A1* | 3/2014 | Sammon | G06Q 10/101 709/204 |
| 2014/0164510 A1 | 6/2014 | Abuelsaad et al. | |
| 2014/0344702 A1 | 11/2014 | Edge et al. | |
| 2015/0149929 A1* | 5/2015 | Shepherd | H04L 12/1822 715/753 |
| 2015/0154291 A1 | 6/2015 | Shepherd et al. | |
| 2016/0092578 A1 | 3/2016 | Ganani | |
| 2016/0104120 A1 | 4/2016 | Agrawal et al. | |
| 2016/0117624 A1* | 4/2016 | Flores | H04L 67/306 705/7.39 |
| 2017/0034226 A1* | 2/2017 | Bostick | G06V 40/172 |
| 2017/0293698 A1 | 10/2017 | Abebe et al. | |
| 2017/0300823 A1* | 10/2017 | Bostick | H04L 67/306 |
| 2018/0039951 A1 | 2/2018 | Wynn et al. | |
| 2018/0101281 A1 | 4/2018 | Nelson et al. | |
| 2018/0101760 A1 | 4/2018 | Nelson et al. | |
| 2018/0101824 A1 | 4/2018 | Nelson et al. | |
| 2018/0191907 A1 | 7/2018 | Herrin et al. | |
| 2018/0322471 A1 | 11/2018 | Anderson et al. | |
| 2018/0365653 A1 | 12/2018 | Cleaver et al. | |
| 2019/0108834 A1 | 4/2019 | Nelson et al. | |
| 2019/0132265 A1* | 5/2019 | Nowak-Przygodzki | H04L 12/1831 |
| 2019/0147882 A1* | 5/2019 | Pankanti | H04M 3/567 704/231 |
| 2019/0228380 A1 | 7/2019 | Shen et al. | |
| 2019/0266238 A1* | 8/2019 | Faulkner | H04L 12/1813 |
| 2019/0295041 A1 | 9/2019 | Sim et al. | |
| 2019/0325202 A1* | 10/2019 | Wang | H04N 7/15 |
| 2020/0005248 A1 | 1/2020 | Gerzi et al. | |
| 2020/0052921 A1 | 2/2020 | van Rensburg | |
| 2020/0066251 A1* | 2/2020 | Kumano | G10L 13/10 |
| 2020/0111046 A1 | 4/2020 | Ball-Marian et al. | |
| 2020/0243095 A1 | 7/2020 | Adlersberg et al. | |
| 2020/0401466 A1* | 12/2020 | Frost | G10L 15/1822 |
| 2020/0403817 A1 | 12/2020 | Daredia et al. | |
| 2021/0044697 A1* | 2/2021 | Khafizov | G06F 18/285 |
| 2021/0117929 A1* | 4/2021 | Lewbel | G06Q 10/1095 |
| 2022/0147716 A1* | 5/2022 | Tomasi | G06F 40/284 |
| 2022/0391233 A1 | 12/2022 | Decrop et al. | |
| 2022/0394077 A1 | 12/2022 | Han | |
| 2023/0007063 A1 | 1/2023 | Gupta et al. | |
| 2023/0009268 A1 | 1/2023 | Zhang et al. | |
| 2023/0054480 A1* | 2/2023 | Wang | H04L 12/1822 |
| 2023/0083298 A1* | 3/2023 | Reece | G06F 40/169 704/231 |
| 2023/0092702 A1* | 3/2023 | Mao | G06F 16/383 704/9 |
| 2023/0169272 A1* | 6/2023 | Brantley | G10L 15/26 704/231 |
| 2023/0223016 A1* | 7/2023 | Konam | G06F 40/284 704/231 |
| 2023/0245646 A1* | 8/2023 | Parthasarathy | G06F 40/216 704/231 |
| 2024/0095459 A1* | 3/2024 | McNeill | G06F 40/35 |

OTHER PUBLICATIONS

TalkTraces: Real-Time Capture and Visualization of Verbal Content in Meetings, CHI 2019 Paper, May 4-9, 2019. (14 pages).
International Search Report and Written Opinion mailed on Mar. 15, 2023 in corresponding PCT Application No. PCT/US2023/011242.
Antonios G Nanos etal., A Virtual Meeting System for the New Age, 2013 IEEE 10th International Conference on e-Business Engineering (Year: 2013).
Supporting virtual meetings in the overall business contextL by Weigang Wang, Jorg M. Haake, Jessica Rubart, International Journal of Computer Applications in Technology (IJCAT), vol. 19, No. 3/4, 2004 (Year: 2004).

* cited by examiner

TIME DISTRIBUTIONS OF PARTICIPANTS ACROSS TOPIC SEGMENTS IN A COMMUNICATION SESSION

FIELD OF INVENTION

The present invention relates generally to digital communication, and more particularly, to systems and methods for presenting time distributions of participants across topic segments in a communication session.

SUMMARY

The appended claims may serve as a summary of this application.

BRIEF DESCRIPTION OF THE DRAWINGS

The present invention relates generally to digital communication, and more particularly, to systems and methods providing for presenting time distributions of participants across topic segments in a communication session.

The present disclosure will become better understood from the detailed description and the drawings, wherein.

DETAILED DESCRIPTION

Figure 1A:
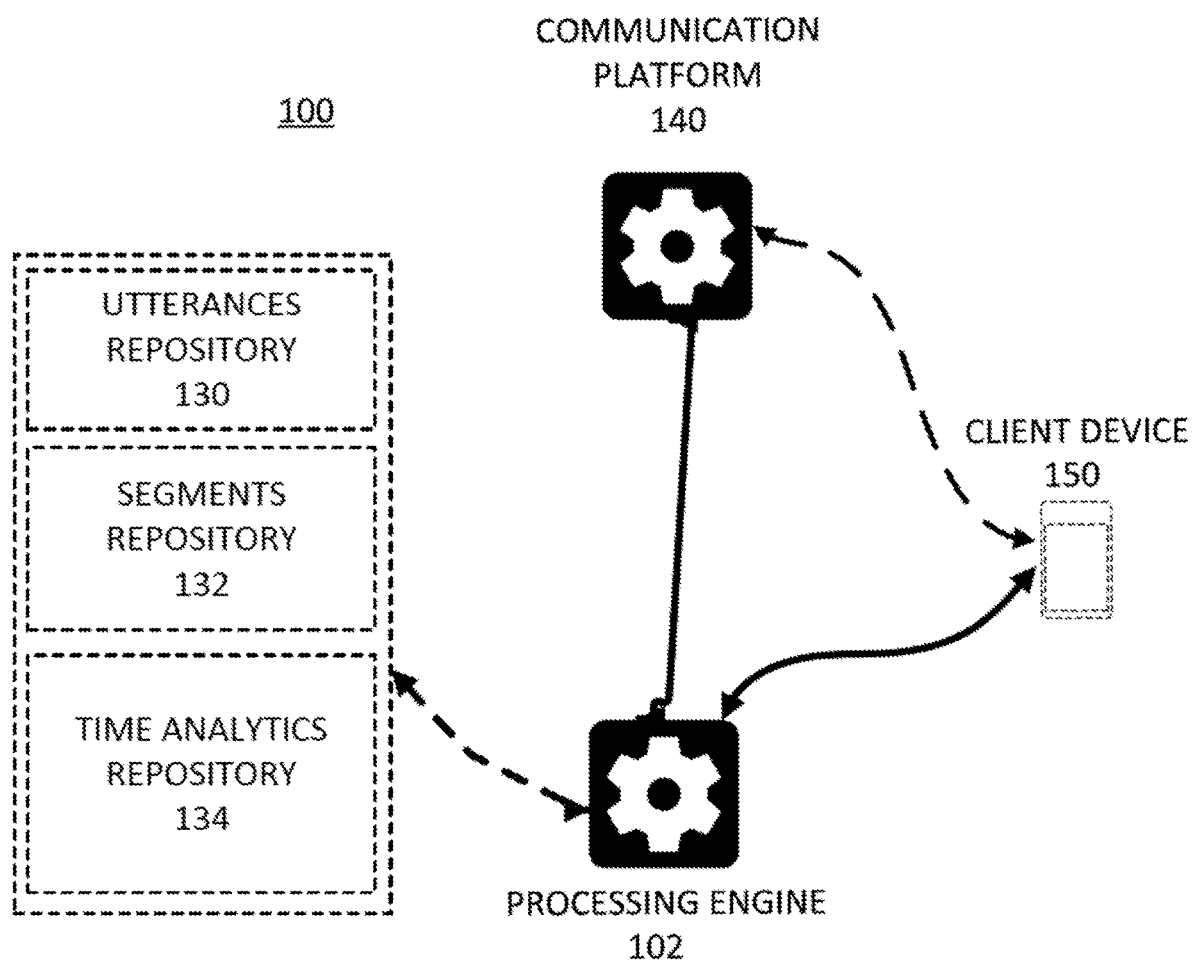
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around time distribution, i.e., the distribution of each user's total amount of time within a meeting across the different topic segments of a meeting. A typical scenario is one in which 60 minutes is scheduled for a meeting, and during the meeting, topics are discussed without urgency for 45 minutes. The participants then realize that they do not have enough time to cover discussion of the remaining two topics. This may lead to the participants having to schedule a follow-up meeting, leading to an unnecessary expenditure of time for all participants. If the participants were able to reduce the time spent on earlier topics, they would have had enough time to talk about the later topics, leading to more productive results. While tools exist for a high-level time distribution analysis across different customers, there is currently no tool for such time distribution analysis that can be dissected within a single meeting for a single customer.

Thus, there is a need in the field of digital communication tools and platforms to create a new and useful system and method for presenting data on time distribution of participants across topic segments. The source of the problem, as discovered by the inventors, is a lack of useful meeting intelligence and analytics data on a per-topic basis provided to members of an organization with respect to remote communication sessions.

In one embodiment, the system connects to a communication session with a number of participants; receives a transcript of a conversation between the participants produced during the communication session, the transcript including timestamps for each utterance of a speaking participant; determines, based on analysis of the transcript, a meeting type for the communication session; generates a number of topic segments for the conversation and respective timestamps for the topic segments; for each participant, analyzes the time spent by the participant on each of the generated topic segments in the meeting; and presents, to one or more users, data on the time distribution of participants for each topic segment and across topic segments within the conversation.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an utterances repository 130, segments repository 132, and/or a time analytics repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
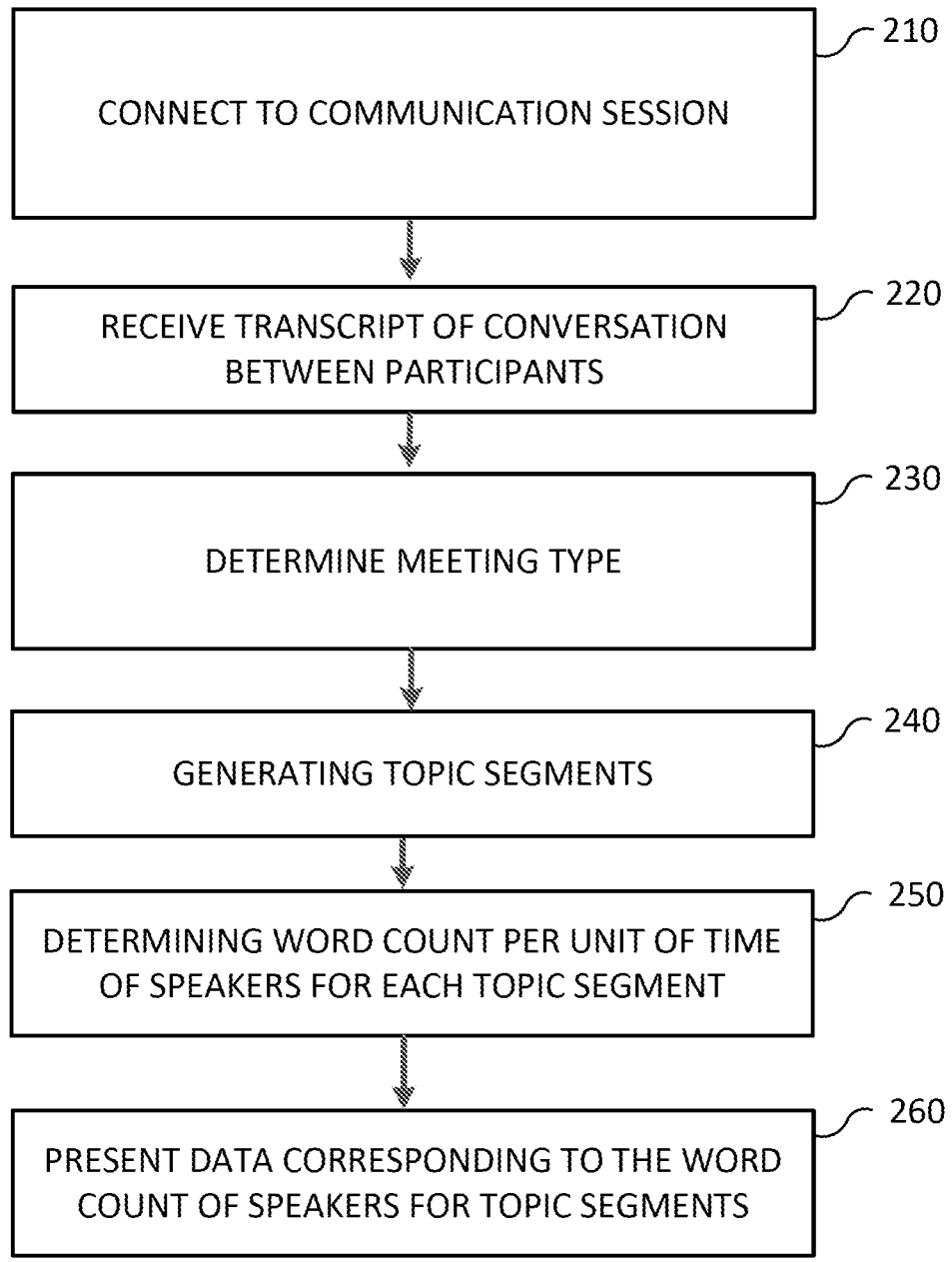
FIG. 2 is a flow chart illustrating an exemplary method that may be performed in some embodiments.

In an embodiment, the processing engine 102 may perform the exemplary method of FIG. 2 or other method herein and, as a result, present time distributions of participants across topic segments in a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an utterances repository 130, segments repository 132, and/or time analytics repository 134. The optional repositories function to store and/or maintain, respectively, information on utterances within the session; timestamps for utterances; and time analytics data. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
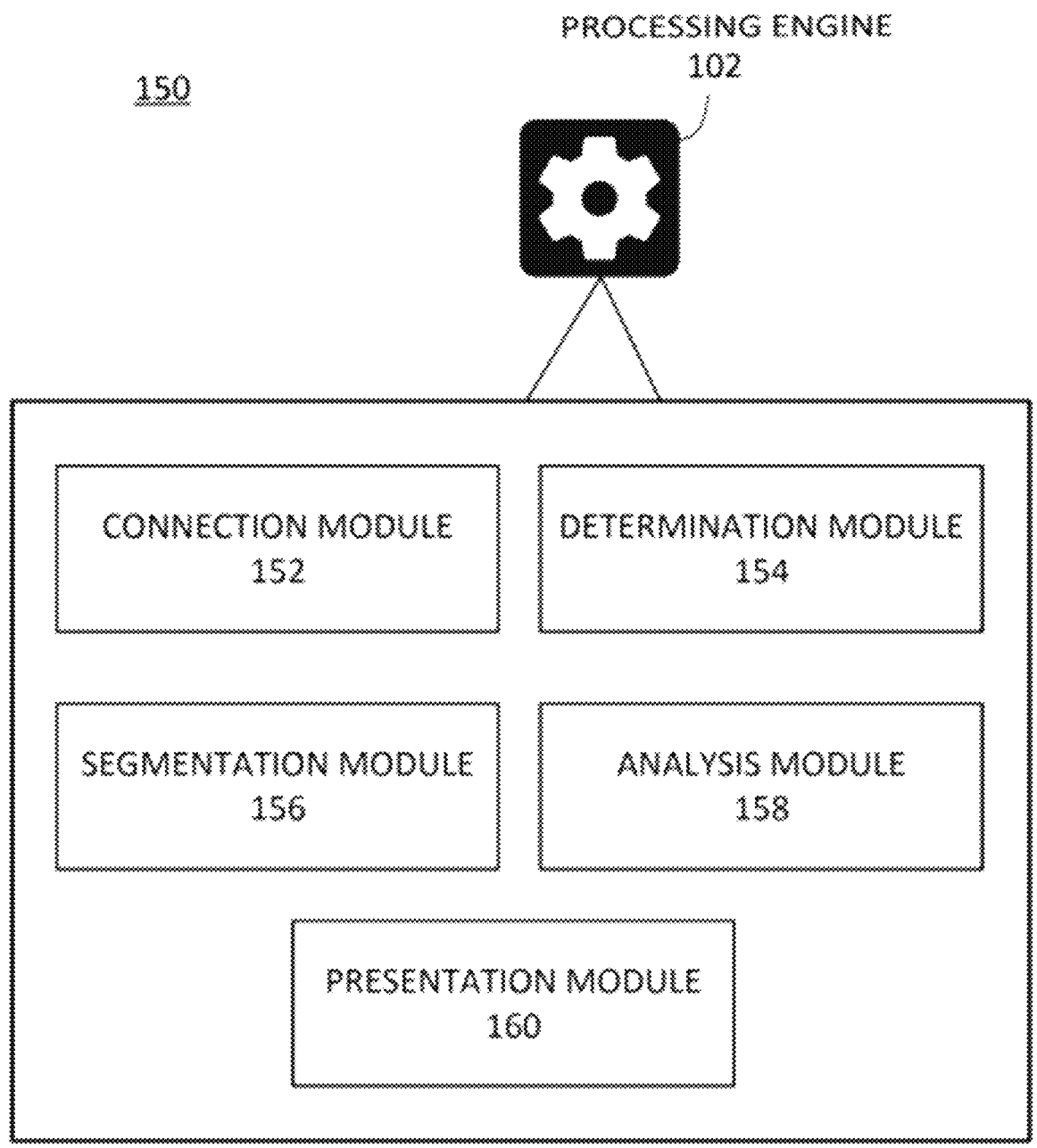
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants, and receive or generate a transcript of a conversation between the participants produced during the communication session.

Determination module 154 functions to determine, based on analysis of the transcript, a meeting type for the communication session.

Segmentation module 156 functions to generate a plurality of topic segments for the conversation and respective timestamps for the topic segments.

Analysis module 158 functions to analyze, for each participant, the time spent on each of the generated topic segments in the meeting.

Presentation module 160 functions to present, for display to one or more users, data on the time distribution of participants across the topic segments for a conversation.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. In some embodiments, automatic speech recognition (ASR) techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

At step 230, the system determines a meeting type for the communication session. This determination is made based on an analysis of the transcript. In some embodiments, the meeting type is determined from a predefined list of meeting types. For example, one meeting type may be a sales meeting, while another meeting type may be an internal department meeting.

The meeting type is relevant because one's talking speed is capable of varying drastically depending on the type of meeting one is attending, both in terms of explaining and in terms of asking questions, among other aspects. Each meeting type follows a specific pattern, and correlates to a fixed set of topic segments. This reflects each meeting type including predictable topics which will always or nearly always be discussed. In some embodiments, the meeting type is further narrowed down per industry.

In some embodiments, the communication session may be a sales session with one or more prospective customers, where at least some of the participants are members of a sales team. The time distributions of participants across topic segments relate to a performance metric for this sales team.

In some embodiments, the meeting type can be determined be a machine learning (ML) or other artificial intelligence (AI) model or models. Such a model can be trained to determine meeting types for communication sessions. In some embodiments, a pre-trained AI model is used. In some embodiments, ASR techniques may be used, and in some embodiments, NLP techniques may be used.

At step 240, the system generates topic segments for the conversation, and respective timestamps for the time segments. In some embodiments, this generation is in part performed based on the meeting type to determine the names of the topic segments, since each meeting type has a fixed set of topic segments. In some embodiments, the system trains one or more artificial intelligence (AI) models to generate topic segments for communication sessions. Further, in some embodiments, determining the topic segments for the conversation is performed by one or more AI models.

Timestamps for the beginning and ending of each of the topic segments are additionally generated. In various embodiments, the timestamps are determined based on ASR techniques and/or NLP techniques to recognize, tag, and/or parse the speech of the participants during the communication session or within a recording of the communication session.

At step 250, the system analyzes the time spent by each participant on each of the generated topic segments in the meeting. In various embodiments, one or more of ASR and NLP techniques are used to analyze this time spent. Such techniques may be used to parse the topic discussion per participant for a given topic. ML models or other AI models may also be used.

In some embodiments, the timestamps are used to calculate the time duration for the communication session as a whole. In some embodiments, this is performed instead of calculating the number of words in the transcript, which relies heavily on the transcript and which does not provide accurate data on time spent. Thus, the timestamps, which are tied to the utterances from participants within the transcripts, provide an indication of the time spent by each participant in any given moment of the session. When combined with the determination of topic segments and their starting and/or ending timestamps, the system can determine the time spent by each participant on each of the generated time segments in the meeting.

At step 260, the system presents, to one or more users, data on the time distribution of participants for each topic segment and across topic segments within the conversation. This data on the time distribution of participants for each topic segment and across topic segments is determined as a result of the analysis from step 250.

In some embodiments, the data may include analytics involving distribution per topic segment, indicated as a percentage of the overall duration of the communication session. In some embodiments, the users may be presented with the time distribution in terms of minutes and/or seconds spent per topic segment.

Figure 3:
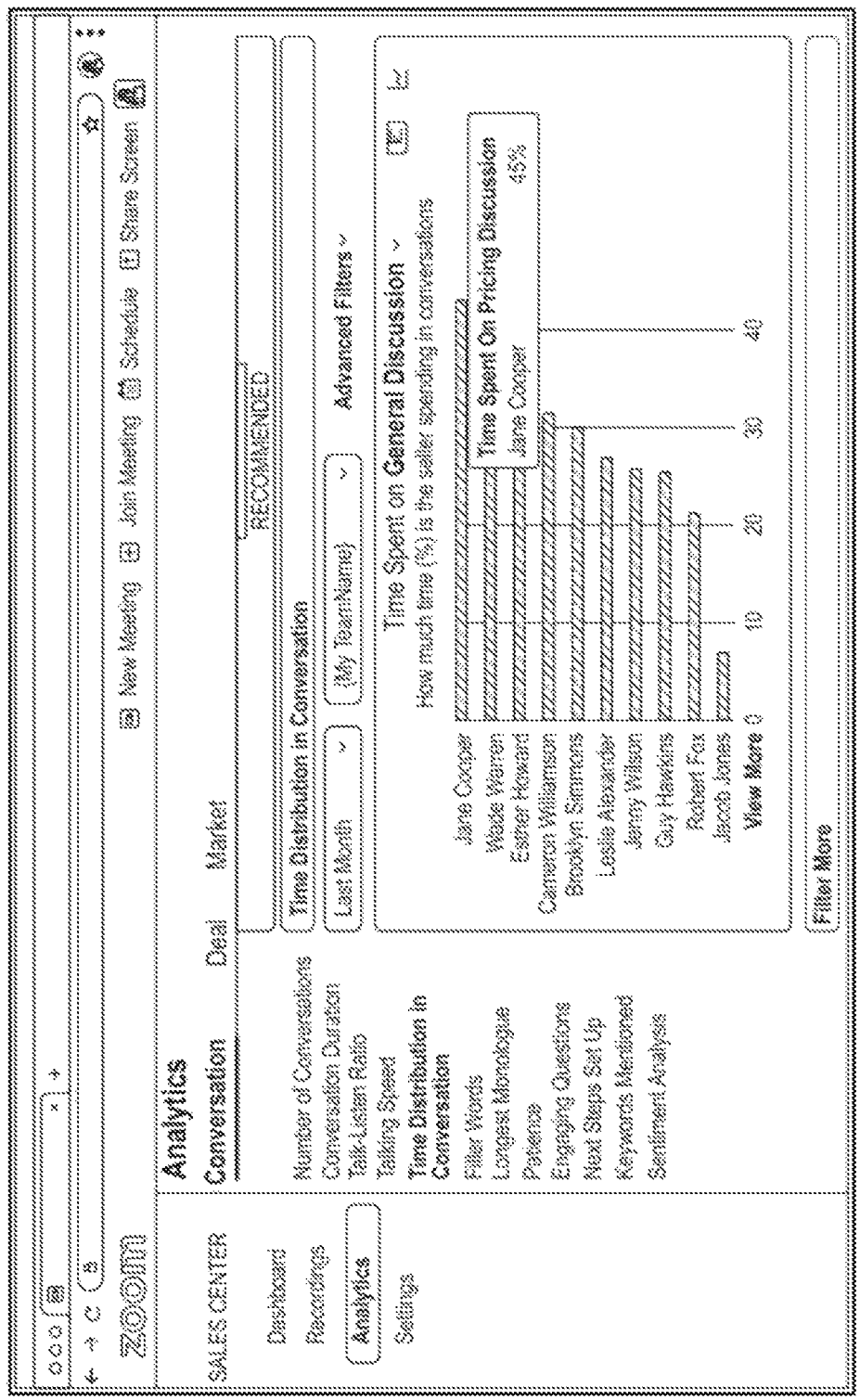
FIG. 3 is a diagram illustrating one example embodiment of a user interface for presenting time distributions of participants across topic segments in a communication session.

In some embodiments, the data is presented such that participants can compare their time distributions across topic segments with other participants. In some embodiments, the users can filter the presented time distribution by one or more of: team name, deal name, time window, and team members. In some embodiments involving sales metrics, users can filter based on whether a deal has been, e.g., closed, won, lost, and/or abandoned. In some embodiments, users may be visually presented with a time distribution comparison of all of the different topic segments. This can be presented as, e.g., a timeline, graph, chart, or any other visual presentation of data. In some embodiments, this data may be able to be customized by users in various ways in terms of how it is presented and shown. An example of presenting data on time distribution of participants across topic segments is illustrated in FIG. 3 below.

In some embodiments, more detailed data per topic segment can be displayed. In some embodiments, users may be able to search or filter based on, e.g., specific utterances, keywords, terminology specific to the industry or the organization, topic segments, and/or any other suitable search or filter criteria. In some embodiments, a summarized topics list may be presented to users which includes a list of topic segments, as well as a summary or sublist of data for each of the topics.

In some embodiments, the data is displayed at one or more client devices which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on time distribution across topic segments if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Within this displayed UI presented to the one or more users, data corresponding to time distribution of participants across topic segments can be displayed. For example, a UI may be shown which displays aggregate analytics data pertaining to a sales team's meetings with clients over multiple conversations and communication sessions. Within this aggregate analytics data, time distribution of participants across topic segments, and further across conversations can be displayed with respect to the entire team's performance. In some embodiments, data on time distribution across topic segments is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, a UI element with a playback recording may present one or more pieces of aggregate analytics data or individual analytics data corresponding to the communication session as a whole, the particular topic segment the user is playing back, or any other suitable data which can be presented.

FIG. 3 is a diagram illustrating one example embodiment of a user interface ("UI") for presenting time distributions of participants across topic segments in a communication session.

Within the illustrated UI, an "Analytics" tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Time Distribution in Conversation", which is currently selected for display within the UI window. This set of analytics data shown includes at least data on time spent by individual participants on a given topic segment across multiple conversations, as shown in a percentage assigned to each participant. An aggregate of time distributions for users across multiple conversations is calculated and presented here.

In the example, Jane Cooper has spent 45% of her time in conversations on a General Discussion, while Jacob Jones has spent under 10% on the same topic. Aggregate time distributions for other topics can be viewed by the user selecting the "General Discussion" drop-down box and selected a different topic name.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

Figure 4:
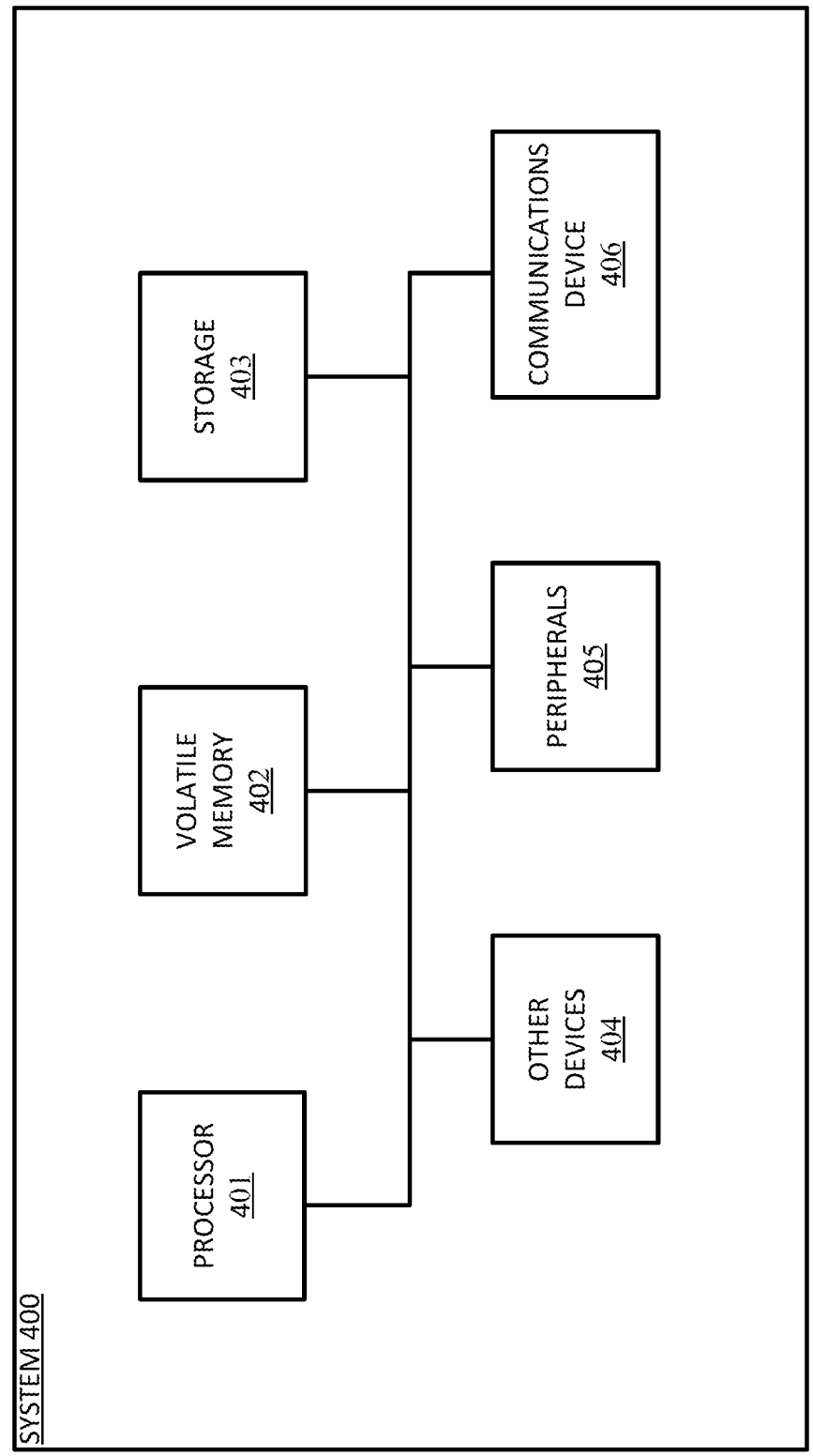
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1. A method, comprising: connecting to a communication session with a plurality of participants; receiving a transcript of a conversation between the participants produced during the communication session, the transcript comprising timestamps for each utterance of a speaking participant; determining, based on analysis of the transcript, a meeting type for the communication session; generating a plurality of topic segments for the conversation and respective timestamps for the topic segments; for each participant, analyzing the time spent by the participant on each of the generated topic segments in the meeting; and presenting, to one or more users, data on the time distribution of participants for each topic segment and across the topic segments within the conversation.

Example 2. The method of example 1, further comprising: training one or more artificial intelligence (AI) models to generate topic segments for communication sessions, determining the plurality of topic segments for the conversation being performed by the one or more AI models.

Example 3. The method of any of examples 1-2, wherein at least one of generating the topic segments for the conversation, determining a meeting type, and analyzing the time spent by each participant on each generated topic segment was performed at least in part based on one or more natural language processing (NLP) techniques.

Example 4. The method of any of examples 1-3, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 5. The method of any of examples 1-4, further comprising: additionally presenting the time distribution of the participants for each topic segment and across the topic segments in aggregated form.

Example 6. The method of any of examples 1-5, wherein the time distribution of participants across the topic segments is presented such that participants can compare their time distributions with other participants.

Example 7. The method of any of examples 1-6, wherein the one or more users presented with the data can filter the presented time distribution by one or more of: team name, deal name, time window, and team members.

Example 8. The method of any of examples 1-7, wherein at least one of generating the transcript, generating the topic segments for the conversation, determining a meeting type, and analyzing the time spent by each participant on each generated topic segment was performed at least in part by one or more pre-trained AI models.

Example 9. The method of any of examples 1-8, wherein: the communication session is a sales session with one or more prospective customers, at least some of the participants are members of a sales team, and the presented time distributions of participants across topic segments relate to a performance metric for the sales team.

Example 10. The method of any of examples 1-9, wherein the one or more users presented with the data are one or more of: one or more participants of the communication session associated with a prespecified organization, one or more administrators or hosts of the communication session, one or more users within an organizational reporting chain of participants of the communication session, and/or one or more authorized users within the organization.

Example 11. The method of any of examples 1-10, wherein: the transcript is received or generated in real time while the communication session is underway, and the time distributions of speaking participants across topic segments are presented in real time to the one or more users while the communication session is underway.

Example 12. The method of any of examples 1-11, wherein each meeting type correlates to a fixed set of topic segments.

Example 13. The method of any of examples 1-12, wherein the time distribution of participants per topic segment can be filtered based on one or more of: topic segment name, speaking participant name, and time within communication session.

Example 14. The method of any of examples 1-13, further comprising: training one or more artificial intelligence (AI) models to generate topic segments for communication sessions, determining the plurality of topic segments for the conversation being performed by the one or more AI models.

Example 15. The method of any of examples 1-14, wherein at least one of generating the topic segments for the conversation, determining a meeting type, and analyzing the time spent by each participant on each generated topic segment was performed at least in part based on one or more natural language processing (NLP) techniques.

Example 16. The method of any of examples 1-15, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 17. The method of any of examples 1-16, wherein the one or more processors are further configured to perform the operations of: additionally presenting the time distribution of the participants across the topic segments in aggregated form.

Example 18. The method of any of examples 1-17, wherein the time distribution of participants across the topic segments is presented such that participants can compare their time distributions with other participants.

Example 19. A communication system comprising one or more processors configured to perform the operations of: connecting to a communication session with a plurality of participants; receiving a transcript of a conversation between the participants produced during the communication session, the transcript comprising timestamps for each utterance of a speaking participant; determining, based on analysis of the transcript, a meeting type for the communication session; generating a plurality of topic segments for the conversation and respective timestamps for the topic segments; for each participant, analyzing the time spent by the participant on each of the generated topic segments in the meeting; and presenting, to one or more users, data on the time distribution of participants for each topic segment and across the topic segments within the conversation.

Example 20. The communication system of example 19, wherein the one or more processors are further configured to perform the operations of: training one or more artificial intelligence (AI) models to generate topic segments for communication sessions, determining the plurality of topic segments for the conversation being performed by the one or more AI models.

Example 21. The communication system of any of examples 19-20, wherein at least one of generating the topic segments for the conversation, determining a meeting type, and analyzing the time spent by each participant on each generated topic segment was performed at least in part based on one or more natural language processing (NLP) techniques.

Example 22. The communication system of any of examples 19-21, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 23. The communication system of any of examples 19-22, wherein the one or more processors are further configured to perform the operations of: additionally presenting the time distribution of the participants across the topic segments in aggregated form.

Example 24. The communication system of any of examples 19-23, wherein the time distribution of participants across the topic segments is presented such that participants can compare their time distributions with other participants.

Example 25. The communication system of any of examples 19-24, further comprising: training one or more artificial intelligence (AI) models to generate topic segments for communication sessions, determining the plurality of topic segments for the conversation being performed by the one or more AI models.

Example 26. The communication system of any of examples 19-25, wherein at least one of generating the topic segments for the conversation, determining a meeting type, and analyzing the time spent by each participant on each generated topic segment was performed at least in part based on one or more natural language processing (NLP) techniques.

Example 27. The communication system of any of examples 19-26, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 28. The communication system of any of examples 19-27, further comprising: additionally presenting the time distribution of the participants for each topic segment and across the topic segments in aggregated form.

Example 29. The communication system of any of examples 19-28, wherein the one or more users presented with the data can filter the presented time distribution by one or more of: team name, deal name, time window, and team members.

Example 30. The communication system of any of examples 19-29, wherein at least one of generating the transcript, generating the topic segments for the conversation, determining a meeting type, and analyzing the time spent by each participant on each generated topic segment was performed at least in part by one or more pre-trained AI models.

Example 31. The communication system of any of examples 19-30, wherein: the communication session is a sales session with one or more prospective customers, at least some of the participants are members of a sales team, and the presented time distributions of participants across topic segments relate to a performance metric for the sales team.

Example 32. The communication system of any of examples 19-31, wherein the one or more users presented with the data are one or more of: one or more participants of the communication session associated with a prespecified organization, one or more administrators or hosts of the communication session, one or more users within an organizational reporting chain of participants of the communication session, and/or one or more authorized users within the organization.

Example 33. The communication system of example 32, wherein: the transcript is received or generated in real time while the communication session is underway, and the time distributions of speaking participants across topic segments are presented in real time to the one or more users while the communication session is underway.

Example 34. The communication system of any of examples 19-33, wherein each meeting type correlates to a fixed set of topic segments.

Example 35. The communication system of any of examples 19-34, wherein the time distribution of participants per topic segment can be filtered based on one or more of: topic segment name, speaking participant name, and time within communication session.

Example 36. The communication system of any of examples 19-35, wherein the one or more processors are further configured to perform the operations of: training one or more artificial intelligence (AI) models to generate topic segments for communication sessions, determining the plurality of topic segments for the conversation being performed by the one or more AI models.

Example 37. The communication system of any of examples 19-36, wherein at least one of generating the topic segments for the conversation, determining a meeting type, and analyzing the time spent by each participant on each generated topic segment was performed at least in part based on one or more natural language processing (NLP) techniques.

Example 38. The communication system of any of examples 19-37, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 39. The communication system of any of examples 19-38, wherein the one or more processors are further configured to perform the operations of: additionally presenting the time distribution of the participants across the topic segments in aggregated form.

Example 40. The communication system of any of examples 19-39, wherein the time distribution of participants across the topic segments is presented such that participants can compare their time distributions with other participants.

Example 41. A non-transitory computer-readable medium containing instructions for generating a note with session content from a communication session, comprising: instructions for connecting to a communication session with a plurality of participants; instructions for receiving a transcript of a conversation between the participants produced during the communication session, the transcript comprising timestamps for each utterance of a speaking participant; instructions for determining, based on analysis of the transcript, a meeting type for the communication session; instructions for generating a plurality of topic segments for the conversation and respective timestamps for the topic segments; for each participant, instructions for analyzing the time spent by the participant on each of the generated topic segments in the meeting; and instructions for presenting, to one or more users, data on the time distribution of participants for each topic segment and across the topic segments within the conversation.

Example 42. The non-transitory computer-readable medium of example 41, further comprising: training one or more artificial intelligence (AI) models to generate topic segments for communication sessions, determining the plurality of topic segments for the conversation being performed by the one or more AI models.

Example 43. The non-transitory computer-readable medium of any of examples 41-42, wherein at least one of generating the topic segments for the conversation, determining a meeting type, and analyzing the time spent by each participant on each generated topic segment was performed at least in part based on one or more natural language processing (NLP) techniques.

Example 44. The non-transitory computer-readable medium of any of examples 41-43, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 45. The non-transitory computer-readable medium of any of examples 41-44, further comprising: additionally presenting the time distribution of the participants for each topic segment and across the topic segments in aggregated form.

Example 46. The non-transitory computer-readable medium of any of examples 41-45, wherein the time distribution of participants across the topic segments is presented such that participants can compare their time distributions with other participants.

Example 47. The non-transitory computer-readable medium of any of examples 41-46, wherein the one or more users presented with the data can filter the presented time distribution by one or more of: team name, deal name, time window, and team members.

Example 48. The non-transitory computer-readable medium of any of examples 41-47, wherein at least one of generating the transcript, generating the topic segments for the conversation, determining a meeting type, and analyzing the time spent by each participant on each generated topic segment was performed at least in part by one or more pre-trained AI models.

Example 49. The non-transitory computer-readable medium of any of examples 41-48, wherein: the communication session is a sales session with one or more prospective customers, at least some of the participants are members of a sales team, and the presented time distributions of participants across topic segments relate to a performance metric for the sales team.

Example 50. The non-transitory computer-readable medium of any of examples 41-49, wherein the one or more users presented with the data are one or more of: one or more participants of the communication session associated with a prespecified organization, one or more administrators or hosts of the communication session, one or more users within an organizational reporting chain of participants of the communication session, and/or one or more authorized users within the organization.

Example 51. The non-transitory computer-readable medium of any of examples 41-50, wherein: the transcript is received or generated in real time while the communication session is underway, and the time distributions of speaking participants across topic segments are presented in real time to the one or more users while the communication session is underway.

Example 52. The non-transitory computer-readable medium of any of examples 41-51, wherein each meeting type correlates to a fixed set of topic segments.

Example 53. The non-transitory computer-readable medium of any of examples 41-52, wherein the time distribution of participants per topic segment can be filtered based on one or more of: topic segment name, speaking participant name, and time within communication session.

Example 54. The non-transitory computer-readable medium of any of examples 41-53, wherein the one or more processors are further configured to perform the operations of: training one or more artificial intelligence (AI) models to generate topic segments for communication sessions, determining the plurality of topic segments for the conversation being performed by the one or more AI models.

Example 55. The non-transitory computer-readable medium of any of examples 41-54, wherein at least one of generating the topic segments for the conversation, determining a meeting type, and analyzing the time spent by each participant on each generated topic segment was performed at least in part based on one or more natural language processing (NLP) techniques.

Example 56. The non-transitory computer-readable medium of any of examples 41-55, wherein at least one of generating the transcript, generating the topic segments for the conversation, determining a meeting type, and analyzing the time spent by each participant on each generated topic segment was performed at least in part based on one or more automatic speech recognition (ASR) techniques.

Example 57. The non-transitory computer-readable medium of any of examples 41-56, wherein the one or more processors are further configured to perform the operations of: additionally presenting the time distribution of the participants across the topic segments in aggregated form.

Example 58. The non-transitory computer-readable medium of any of examples 41-57, wherein the time distribution of participants across the topic segments is presented such that participants can compare their time distributions with other participants.

Some portions of the preceding detailed descriptions have been presented in terms of algorithms and symbolic representations of operations on data bits within a computer memory.

These algorithmic descriptions and representations are the ways used by those skilled in the data processing arts to most effectively convey the substance of their work to others skilled in the art.

An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    connecting to a communication session with a plurality of participants;
    receiving a transcript of a conversation between the participants produced during the communication session, the transcript comprising timestamps for each utterance of a speaking participant;
    determining, based on analysis of the transcript, a meeting type for the communication session;
    generating a plurality of topic segments for the conversation and respective timestamps for the topic segments;
    for each participant, analyzing an amount of time spent by the participant on each of the generated topic segments in the communication session;
    presenting, to one or more users, data on time distributions of the participants for each topic segment and across the topic segments within the conversation; and
    presenting, to the one or more users, the time distributions of the participants for each topic segment and across the topic segments in aggregated form.

2. The method of claim 1, further comprising:
    training one or more artificial intelligence (AI) models to generate topic segments for communication sessions,
    determining the plurality of topic segments for the conversation being performed by the one or more AI models.

3. The method of claim 1, wherein at least one of generating the topic segments for the conversation, determining the meeting type, and analyzing the amount of time spent by each participant on each generated topic segment was performed at least in part based on one or more natural language processing (NLP) techniques.

4. The method of claim 1, wherein at least one of generating the transcript, generating the topic segments for the conversation, determining the meeting type, and analyzing the amount of time spent by each participant on each generated topic segment was performed at least in part based on one or more automatic speech recognition (ASR) techniques.

5. The method of claim 1, wherein the time distributions of participants across the topic segments are presented such that participants can compare their time distributions with other participants.

6. The method of claim 1, wherein the one or more users presented with the data can filter the presented time distributions by one or more of: team name, deal name, time window, and team members.

7. The method of claim 1, wherein at least one of generating the transcript, generating the topic segments for the conversation, determining the meeting type, and analyzing the amount of time spent by each participant on each generated topic segment was performed at least in part by one or more pre-trained AI models.

8. The method of claim 1, wherein:
    the communication session is a sales session with one or more prospective customers,
    at least some of the participants are members of a sales team, and
    the presented time distributions of participants across topic segments relate to a performance metric for the sales team.

9. The method of claim 1, wherein the one or more users presented with the data are one or more of: one or more participants of the communication session associated with a prespecified organization, one or more administrators or hosts of the communication session, one or more users within an organizational reporting chain of participants of the communication session, or one or more authorized users within the organization.

10. The method of claim 1, wherein:
    the transcript is received or generated in real time while the communication session is underway, and
    the time distributions of speaking participants across topic segments are presented in real time to the one or more users while the communication session is underway.

11. The method of claim 1, wherein each meeting type correlates to a fixed set of topic segments.

12. The method of claim 1, wherein the time distributions of participants per topic segment can be filtered based on one or more of: topic segment name, speaking participant name, and time within communication session.

13. A communication system comprising one or more processors configured to perform operations of:
    connecting to a communication session with a plurality of participants;
    receiving a transcript of a conversation between the participants produced during the communication session, the transcript comprising timestamps for each utterance of a speaking participant;

determining, based on analysis of the transcript, a meeting type for the communication session;

generating a plurality of topic segments for the conversation and respective timestamps for the topic segments;

for each participant, analyzing an amount of time spent by the participant on each of the generated topic segments in the communication session;

presenting, to one or more users, data on time distributions of the participants for each topic segment and across the topic segments within the conversation; and presenting, to the one or more users, the time distributions of the participants for each topic segment and across the topic segments in aggregated form.

14. The communication system of claim 13, wherein the one or more processors are further configured to perform operations of:

training one or more artificial intelligence (AI) models to generate topic segments for communication sessions, determining the plurality of topic segments for the conversation being performed by the one or more AI models.

15. The communication system of claim 13, wherein at least one of generating the topic segments for the conversation, determining the meeting type, and analyzing the amount of time spent by each participant on each generated topic segment was performed at least in part based on one or more natural language processing (NLP) techniques.

16. The communication system of claim 13, wherein at least one of generating the transcript, generating the topic segments for the conversation, determining the meeting type, and analyzing the amount of time spent by each participant on each generated topic segment was performed at least in part based on one or more automatic speech recognition (ASR) techniques.

17. The communication system of claim 13, wherein the time distributions of participants across the topic segments are presented such that participants can compare their time distributions with other participants.

18. A non-transitory computer-readable medium containing instructions for generating a note with session content from a communication session, comprising:

instructions for connecting to a communication session with a plurality of participants;

instructions for receiving a transcript of a conversation between the participants produced during the communication session, the transcript comprising timestamps for each utterance of a speaking participant;

instructions for determining, based on analysis of the transcript, a meeting type for the communication session;

instructions for generating a plurality of topic segments for the conversation and respective timestamps for the topic segments;

for each participant, instructions for analyzing an amount of time spent by the participant on each of the generated topic segments in the communication session;

instructions for presenting, to one or more users, data on time distributions of the participants for each topic segment and across the topic segments within the conversation; and instructions for presenting, to the one or more users, the time distributions of the participants for each topic segment and across the topic segments in aggregated form.

* * * * *